United States Patent [19]

Das et al.

[11] Patent Number: 4,771,100
[45] Date of Patent: Sep. 13, 1988

[54] STABLE CATIONIC-INVERSED ANIONIC LATICES

[75] Inventors: Suryya K. Das, Pittsburgh; Charles M. Kania, Cheswick, both of Pa.

[73] Assignee: PPG Industries, Inc., Pittsburgh, Pa.

[21] Appl. No.: 948,167

[22] Filed: Dec. 31, 1986

[51] Int. Cl.$^4$ .......................... C08K 5/16; C08J 23/00; C08F 2/00
[52] U.S. Cl. .................................. 524/714; 524/724; 524/853; 526/220
[58] Field of Search ....................... 524/853, 714, 724; 526/220

[56] References Cited

U.S. PATENT DOCUMENTS 3,963,688  6/1976  Lorenz et al. ...................... 524/853

OTHER PUBLICATIONS

McCutcheon's Functional Materials, North American edition, 1982.

Primary Examiner—Joseph L. Schofer
Assistant Examiner—Peter D. Mulcahy
Attorney, Agent, or Firm—Godfried R. Akorli

[57] ABSTRACT

A stable anionic acrylic latex is prepared by first preparing a cationic acrylic latex by free radical polymerization of a mixture of ethylenically unsaturated monomers, at least one of which contains a carboxylic acid group, in an aqueous acidic medium and in the presence of an externally added cationic surfactant, and then adding a base to said cationic acrylic latex in an amount sufficient to form an anionic acrylic latex having a pH of about 7 or higher.

13 Claims, No Drawings

STABLE CATIONIC-INVERSED ANIONIC LATICES

BACKGROUND OF THE INVENTION

Field of the Invention

This invention relates to stable aqueous emulsions, coating compositions containing the same, the preparation and use thereof, as film formers or as additives with particular reference to their use as thickeners.

Brief Description of the Prior Art

Acrylic latices and their method of preparation involving free radical emulsion polymerization of monomers in waters, in the presence of surfactants, is also known. The free radical emulsion polymerization procedure generally results in high molecular weight polymeric products which are normally in the range of 100,000 to a few million. In this molecular weight range, coatings prepared with the latices display good mechanical properties such as tensile strength and elongation. It has, however, been found that these latices and coatings prepared therefrom leave something to be desired as to properties such as stability of the latices and chemical resistance of their coatings.

These shortcomings are due, at least in part, to the surfactants which are used in the preparation of the latices. In many instances, the surfactants which are water-soluble cause the coating prepared from the latex to be water-sensitive. In some instances, the acrylic latices and their coatings have been found quite unstable, particularly when subjected to mechanical agitation, to heat or cold. Also, some of the prior art latices, particularly those which are of high acid content, do not form good films in that films therefrom are opaque in nature. The opacity of the films is believed to be a manifestation of incompatibility of these latices with other coating ingredients.

Some of the attempts at improving the stability of the latices and have involved variation in the types and/or amounts of surfactants used in the emulsion polymerization. It has, for example, been suggested that the stability of the latices can be improved by adding further amounts of surfactants, particularly when organic initiators are used, or by adding certain stabilizers after completion of the polymerization step. Latices stabilized in this manner are, however, stable only to a limited degree and are vulnerable to external destabilization.

SUMMARY OF THE INVENTION

Accordingly, the present invention encompasses a novel process for preparing a stable acrylic latex; said process comprising:

(1) preparing a cationic acrylic latex by polymerizing a mixture of ethylenically unsaturated monomers and at least one of said monomers containing a carboxylic acid group under free radical polymerization conditions in an acidic aqueous medium, in the presence of an external cationic surfactant; followed by (2) adding a base to the cationic acrylic latex in an amount sufficient to form a anionic acrylic latex having a pH of about 7 or higher. The ethylenically unsaturated monomers which are useful herein are free of or substantially free of amino groups.

The resultant anionic acrylic latex can be of low acid content or high acid content as discussed more fully herein. The resultant anionic acrylic latex is stable, it is free of or substantially free of surfactants, and substantially coagulum-free. In one embodiment the latex having a low acid content can be used as principal film-former in coatings which have good adhesion to the substrate, corrosion resistance and water-insensitivity. In another embodiment, the latex having high acid content is particularly useful as thickeners for synthetic acrylic latices.

DETAILED DESCRIPTION OF THE INVENTION

In the process of this invention, the cationic acrylic latex is prepared by art-known emulsion polymerization techniques wherein an external cationic surfactant which is preferably water-soluble is used as an emulsifier. In this context, the term "external surfactant" is intended to denote a distinction from surfactants derived from polymerizable monomers containing cationic groups or precursors thereof, for example, polymerizable monomers containing amine groups. Illustrative of external surfactants which are useful in this invention are salts of aliphatic amines, primary, secondary or tertiary amines, preferably fatty amines such as dimethyl cocoamine, cetyl trimethyl ammonium bromide, dimethyl stearyl amine and dimethyl oleyl amine. It is preferred that the amines which are useful herein are water-soluble. Consonant therewith, the preferred cationic surfactants are the acid salts of ethoxylated fatty amines such as polyoxyethyl(15)cocoamine, polyethyl(5)-cocoamine and polyoxyethyl(15)stearylamine; the integers represent the degree of ethoxylation.

The amount of surfactant that is used varies primarily with regard to type of the surfactant, the selection of the monomers, and the relative proportions of the monomers. Generally, the total amount of surfactant is between 0.1 to 10 percent by weight based on total weight of monomers and preferably within the range of 2.5 to 7.5 percent by weight. Preferably, the above surfactants will have their gegen-ion derived from acids such as methane sulfonic acid or phosphoric acid.

Examples of the free radical emulsion polymerization techniques which can be employed in the process step of copolymerization involve the pre-emulsification and seeding techniques. In the pre-emulsification technique, a small amount of water is present in the polymerization vessel together with a polymerization initiator and optionally all or part of the emulsifying agent. The monomer charge is emulsified in a larger amount of water and is continuously added to the reaction vessel under polymerizing conditions. If all the emulsifier is not present initially in the reaction vessel, it can be added simultaneously with the monomer addition. Alternately, the total amount of water may be present in the reaction vessel and the monomer or monomers added in bulk form.

In the seeding technique, a small amount of the monomer charge is added to the reaction vessel along with all or part of the polymerization initiator and all or part of the emulsifier and polymerized to form a seed latex. After formation of the seed latex, the remaining polymerization ingredients are added in a continuous manner to the reaction vessel under polymerizing conditions to form the final polymer emulsion.

The free radical polymerization initiators are a water-soluble type. Examples include peroxides such as hydrogen peroxide, azo compounds such as azobiscyanovaleric acid; and redox systems such as t-butyl hydroperoxide and isoascorbic acid, or hydrogen peroxide with ferric ion, which are preferred. Oil-soluble free radical polymerization initiators are not preferred. The amount of initiator which is employed depends somewhat on the nature of the monomers selected including impurities which may accompany the particular monomers. However, the usual range for free radical initiator is about 0.01 to 3 and preferably 0.05 to 1 percent by weight based on total weight of the monomer mixture.

The monomers which are used in the copolymerization step of the process comprise ethylenically unsaturated monomers, at least one of which contains a carboxylic acid group.

The carboxylic acid group-containing monomers can be illustrated by acrylic acid and methacrylic acid. Other carboxylic acid group-containing monomers are crotonic acid, maleic acid or its anhydride, fumaric acid or itaconic acid may be useful herein. Usually, when the other acids are used, they are used in combination with acrylic or methacrylic acids. In the embodiment of the invention wherein the latex is employed as a principal film former, the ethylenically unsaturated carboxylic acid is of a low acid content from about 0.1 to 10, and preferably about 1 to 5, percent by weight based on the total monomer charge. In the embodiment of the invention wherein the latex is employed as a thickener, or a rheology modifier, the ethylenically unsaturated carboxylic acid is of a high acid content from about 25 to 75 acid preferably from about 50 to 65 percent by weight based on the total monomer charge.

Among such other known polymerizable ethylenically unsaturated compounds which can be copolymerized are the alkenyl-aromatic compounds, i.e., the styrene compounds, the derivatives of ethylenically unsaturated acids such as the acrylic esters, acrylic nitriles, maleic esters, and unsaturated alcohol esters, and unsaturated ketones, unsaturated ethers, and other compounds containing one or more ethylenic linkages capable of addition polymerization. Specific examples as such ethylenically unsaturated compounds are styrene, alpha-methylstyrene, vinyl-naphthalene, monochlorostyrene and dichlorostyrene; methyl methacrylate, ethyl acrylate, acrylonitrile, methacrylonitrile, ethyl maleate, alkyl acetate, vinyl methyl ketone, acrylamide and its derivatives, vinyl chloride, and the like.

Monomers containing more than one polymerizable double bond can be used to impart crosslinking or in situ polymerization of the latex particle. Examples of these monomers can be pentaerythritol triacrylate, pentaerythritol tetracrylate, ethylene glycol di(meth)acrylate, 1-6-hexanediol di(meth)acrylate, allyl(meth)acrylate, divinylbenzene or the like.

In the process of this invention the cationic acrylic latex, thus obtained, would have a pH in the acidic range. It is generally, cooled, filtered, and then subjected to a process step comprising adding to the cationic acrylic latex, a base which is preferably water-soluble in an amount sufficient to give a pH of about 7 or higher.

Illustrative examples of the base are the following: ammonia, ammonium hydroxides, alkali metal hydroxides such as sodium hydroxide; alkanolamines such as dimethylethanolamine, diethylethanolamine, and triethanolamine. Preferred herein are bases that are water-soluble and volatile. Dimethylethanolamine and ammonium hydroxide have been used most preferably in the process of this invention.

It would be realized that during the addition of the base to the cationic acrylic latex, there occurs an adjustment of the pH of the latex from an acidic range to a basic range at a value of 7 or greater, i.e., falling of this invention that the addition of the base effects a neutralization of the surfactant moieties of the cationic latex to provide a stable coagulum-free anionic latex which is free or substantially free of an external surfactant and is in effect emulsifiable in the absence of added surfactant. Moreover there results an inversion of the cationic latex to an anionic latex of this invention.

The latices of the present invention can contain small amounts, for example, up to 15 percent by weight based on total solvent weight, including water, of an organic solvent. The organic solvent can be added to the acrylic latex either during or after the emulsion polymerization, preferably after the polymerization. These solvents should be selected such that they will not adversely affect rheological qualities or drying rates of the applied films or film continuity. Hydrocarbon solvents can be used, although stable (not reactive) ester, ketone, ether-ester and other types of water-miscible solvents can be used.

The latices prepared by the process described above can be mixed with a minor amount, that is, up to 20 percent by weight based on total latex weight, or thickening agents, anti-foaming agents, preservatives, pigments, pigment extenders, plasticizers and stabilizers such as non-ionic surfactants and colloidal stabilizers, if desired.

As principal film-formers the acrylic latices of the present invention can be made thermosetting in nature by the presence of curing agents. The curing agents can be an integral part of the polymer or they can be external to the polymer. Curing agents which are integral with the acrylic polymer are as described in U.S. Pat. No. 4,166,882, column 3, line 37, to column 4, line 2, incorporated herein by reference, which discloses curing agents which are an integral part of an acrylic polymer which are prepared by including within the monomer charge polymerizable ethylenically unsaturated monomers containing a self-curing group such as N-methylol ether derivatives of acrylic and methacrylic amides. External curing agent can also be used. These curing agents can be aminoplasts as disclosed in U.S. Pat. No. 4,166,882, column 4, line 50, to column 5, line 28, incorporated herein by reference, or blocked isocyanates as disclosed in U.S. Pat. No. 3,984,299, column 1, line 57, to column 3, line 15. In this instance active hydrogen crosslinkable site are provided in the acrylic latex backbone through copolymerizable monomers such as hydroxy functional monomers or precursors thereof.

EXAMPLE 1

The following example shows the preparation of the anionic acrylic latex of this invention.

The following were used in the preparation:

| Reactor Charge | |
| --- | --- |
| Ingredients | Parts by Weight |
| Deionized water | 410.0 |
| ETHOMEEN C-25[1] | 10.5 |
| Phosphoric acid | 4.5 grams |

[1]Ethoxylated 2-hydroxyethyl cocoamine, available from Armak Company.

| Ingredients | Parts by Weight |
|---|---|
| Feed A | |
| Erythorbic acid | 1.68 |
| Deionized water | 20.0 |
| Feed B | |
| Methyl methacrylate | 195.3 |
| Styrene | 118 |
| 2-Ethylhexyl acrylate | 52.5 |
| Isodecyl methacrylate | 42 |
| Acrylic acid | 12.2 |
| Tertiary-butyl hydroperoxide (70) | 2.4 |
| Feed C | |
| ETHOMEEN C-25 | 10.5 |
| Deionized water | 100.0 |
| Phosphoric acid | 2.1 |
| Feed D | |
| Ammonium hydroxide | 13.8 |

Into a vessel containing Feed C is introduced Feed B over a period of one hour so as to effect a pre-emulsification of Feed B which comprises the monomer charge. Meanwhile, the reactor charge was heated and agitated in a properly equipped reactor. At a temperature of about 85° C., Feed A was added to the reactor charge followed by the addition of the above pre-emulsified monomers at a rate of 55 cc. per 15 minutes for a period of about 3 hours. Upon the completion of the addition of the monomer feed, the reaction vessel was held at a temperature of 85° C. for 2 hours. The reaction mixture was analyzed and found to have a resin solids content of 40 percent and a pH of 3.6. Feed D was then added to the mixture with agitation. The resultant emulsion had a pH of about 8.2 and a Brookfield viscosity of 30 centipoises measured at 22° C. with a No. 1 spindle at 20 rpm's and a particle size of 1091 Angstroms. The emulsion was found to be free of coagulum.

EXAMPLE 2

| Reactor Charge | |
|---|---|
| Ingredients | Parts by Weight |
| Deionized water | 410.0 |
| ETHOMEEN C-25 | 10.5 |
| Phosphoric acid | 4.5 |

| Ingredients | Parts by Weight |
|---|---|
| Feed A | |
| Erythorbic acid | 1.68 |
| Deionized water | 20.0 |
| Feed B | |
| Ethyl acrylate | 288.1 |
| Methyl methacrylate | 123.5 |
| Acrylic acid | 8.4 |
| Tertiary-butyl hydroperoxide (70) | 2.4 |
| Feed C | |
| ETHOMEEN C-25 | 10.5 |
| Deionized water | 100.0 |
| Phosphoric acid | 2.1 |
| Feed D | |
| Ammonium hydroxide | 7.0 |

Into a vessel containing Feed C is introduced Feed B at a rate of 100 mil per 15 minutes over a period of one hour to effect pre-emulsification of the monomer charge. Meanwhile, the initial charge was heated and agitated in a properly equipped reactor. At a temperature of 85° C., Feed A was added to the reactor charge followed by the addition of the pre-emulsified monomer over 3 hours at 50 mil per 15 minutes, maintaining the polymerization temperature of 80–85° C. At the completion of the pre-emulsified monomer charge addition, the reaction mixture was held for 2 hours at a temperature of 83° C. Thereafter, the mixture was cooled and filtered. The pH of the mixture was about 3.7 and its Brookfield viscosity was 50 centipoises measured at 22° C. with a No. 1 spindle at 20 rpm's. Feed D was then added to the mixture with agitation. The resulting emulsion had a pH of about 8.2. The emulsion was free of coagulum and had a solids content of about 44.2 percent and a particle size of 889 Angstroms.

The thermosetting compositions prepared as described above can be employed in coating compositions which may be pigmented. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red and chromium yellow.

The pigment content of the paint is usually expressed as the pigment-to-resin weight ratio. In the practice of the present invention, the pigment-to-resin weight ratios are as high as 2:1, for most pigmented coatings, are within the range of 0.5 to 1:1.

The latices of the present invention, including pigmented latices, are stable, that is, they are non-sedimenting when stored at 10 to 30° C. If any sediment does form, it is the type which can be redispersed with mild agitation. The latices, especially in the form of thermosetting compositions, and the coating compositions derived therefrom, have been found to provide films having good wet appearance, adhesion when applied to substrates and additionally have properties of durability, corrosion resistance and excellent appearance, upon cure.

As thickeners, particularly for acrylic, for emulsion, the latices with high acid content can be employed in amounts sufficient to give the desired application viscosity.

Having generally described the features of this invention, the following examples are given to illustrate more fully to those skilled in the art, the practice of this invention without intending any limitations thereby. All parts and percentages are by weight unless otherwise indicated.

EXAMPLE 3

The following example shows the preparation of the anionic acrylic latex of high acid content.

| Reactor Charge | |
|---|---|
| Ingredients | Parts by Weight |
| Deionized water | 1625.5 |
| ETHOMEEN C-25 | 5.25 |
| Phosphoric acid | 1.5 |

| Ingredients | Parts by Weight |
|---|---|
| Feed A | |
| Isoascorbic acid | 0.84 |
| Deionized water | 50.0 |
| Feed B | |
| Methyl methacrylate | 105.0 |
| Styrene | 102.9 |
| 1% Pentaerythritol triacrylate | 2.1 |

| Ingredients | Parts by Weight |
| --- | --- |
| *Feed C* | |
| ETHOMEEN C-25 I | 5.25 |
| Deionized water | 100.0 |
| Phosphoric acid | 1.5 |
| T-butyl hydroperoxide | 0.9 |
| *Feed D* | |
| Deionized water | 5.0 |
| 0.1% Tertiary-butyl hydroperoxide | 0.3 |
| *Feed E* | |
| 2% TRITON 101[1] | 4.2 |
| *Feed F* | |
| Pre-emulsion of Feed B and C | 316.25 |
| *Feed G* | |
| Dimethylethanolamine | 97.5 |

[1] Nonionic surfactant available from Rohm & Haas Co.

In a properly equipped vessel, the reactor charge was heated with agitation under a nitrogen blanket to about 82° C. and 5% of Feed F, 25% of Feed A and all of Feed D were added to the reactor charge and the resultant mixture was held for 15 minutes. Thereafter and at about 85° C., the rest of Feeds A and F were added over a period of 3 hours. Upon the completion of the addition of Feeds A and F, the reaction mixture was held at a temperature of 85° C. for 2 hours. Feed G was then added to the mixture with agitation. The resultant emulsion had a pH of about 9 and a viscosity of 6200 centipoises measured at 22° C. with a No. 6 spindle at 50 rpm's. The emulsion was found to be free of coagulum.

We claim:

1. A process for preparing a stable anionic latex comprising:
    (1) preparing a cationic acrylic latex by polymerizing a mixture of ethylenically unsaturated monomers, and at least one of said monomers containing a carboxylic acid group under free radical polymerization conditions in an acidic aqueous medium, in the presence of an external cationic surfactant; followed by
    (2) adding a base to the cationic acrylic latex in an amount sufficient to form an anionic acrylic latex having a pH of about 7 or higher.

2. A process of claim 1 wherein the cationic surfactant is derived from a fatty amine.

3. A process of claim 2 wherein the cationic surfactant is derived from a water-soluble fatty amine.

4. A process of claim 3 wherein the fatty amine is an ethoxylated water-soluble fatty amine.

5. A process of claim 1 wherein the ethylenically unsaturated monomer containing carboxylic acid group is presence in an amount of about 0.1 to 10 percent by weight based on total monomer charge.

6. A process of claim 1 wherein the ethylenically unsaturated monomer containing carboxylic acid group is present in an amount of about 25 to 70 percent by weight based on the total monomer charge.

7. A process of claim 1 wherein the base is selected from the group consisting of ammonia, ammonium hydroxide, amine, alkanolamine and alkali metal hydroxide.

8. A process of claim 7 wherein the base is dimethylethanolamine.

9. An anionic acrylic latex which is prepared by the process of claim 1.

10. An anionic latex which is prepared by the process of claim 5.

11. An anionic latex which is prepared by the process of claim 6.

12. A coating composition comprising an anionic acrylic latex of claim 10.

13. A coating composition comprising the anionic acrylic latex of claim 11.

* * * * *

UNITED STATES PATENT AND TRADEMARK OFFICE
CERTIFICATE OF CORRECTION

PATENT NO. : 4,771,100

DATED : September 13, 1988

INVENTOR(S) : Syryya K. Das et al

It is certified that error appears in the above-identified patent and that said Letters Patent is hereby corrected as shown below:

Claim 5 (column 8, line 15), the word "presence" should read --present--.

Signed and Sealed this

Tenth Day of April, 1990

Attest:

*Attesting Officer*

HARRY F. MANBECK, JR.

*Commissioner of Patents and Trademarks*